(No Model.)

W. H. DODGE.
ROPE SPLICE.

No. 345,219. Patented July 6, 1886.

WITNESSES:
J. B. McGinn.
H. H. Cooper.

INVENTOR
Wallace H. Dodge
By his Atty
R. D. O. Smith

N. PETERS, Photo-Lithographer, Washington, D. C.

UNITED STATES PATENT OFFICE.

WALLACE H. DODGE, OF MISHAWAKA, INDIANA.

ROPE-SPLICE.

SPECIFICATION forming part of Letters Patent No. 345,219, dated July 6, 1886.

Application filed April 1, 1886. Serial No. 197,437. (No model.)

*To all whom it may concern:*

Be it known that I, WALLACE H. DODGE, of Mishawaka, in the county of St. Joseph and State of Indiana, have invented new and useful Improvements in Splicing Ropes Employed as Bands for the Transmission of Power; and I do hereby declare that the following is a full and accurate description of the same.

Letters Patent No. 320,544 were granted to me June 23, 1885, for a system of rope transmission, and said patent is here referred to merely by way of explanation of the invention herein described.

In practical operation the durability of the rope as a transmitter of power over pulleys is measured by the durability of the splice whereby the ends of the rope are joined to constitute an endless band. It is required that the spliced portion shall be no more liable to abrasion than other parts of the rope, and that the strains shall be transmitted to the several strands of the rope in the spliced portion with the same equality and uniformity as in other parts of the rope; but experience has demonstrated that it is impossible to untwist the strands of a rope and retwist them, or interweave them in a splice and preserve the original uniformity of twist or tension; hence a transmitting-rope not only presents an enlarged section at the point of its splice, but it also presents at that point strands which have been disturbed and out of uniformity as to tension. In passing the pulleys the enlarged portion is subjected to greater friction and abrasion than other parts, and those strands which have the greater tension are unduly strained. The effect is a wearing out of the rope at the splice and a necessity for frequent repair.

The object of my invention is to obviate the practical difficulty attending the use of all heretofore known modes of splicing; and it consists in covering the joint with a sleeve of suitable rawhide or leather, and connecting said sleeve at its ends with the strands of the rope individually, preferably by means of thongs cut from the end of the sleeve itself, said thongs being wound and wrapped around the several strands of the rope, so as to be firmly united thereto, as well as to cover and protect the strands themselves. The sleeve of hide must be of such width as to possess a strength equal or superior to the strength of the rope.

Figure 3:
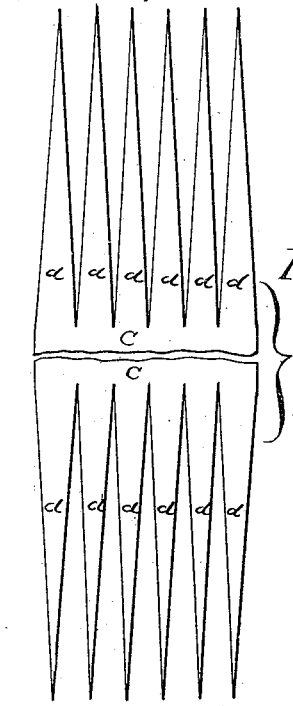
Figure 4:
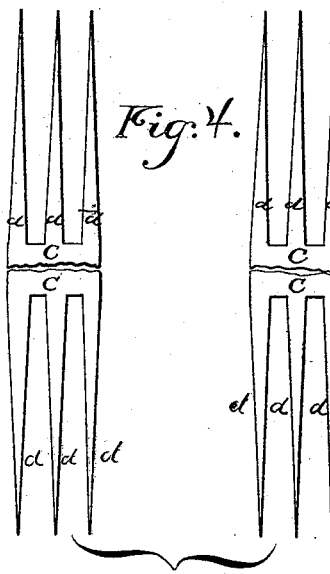
Figure 1:
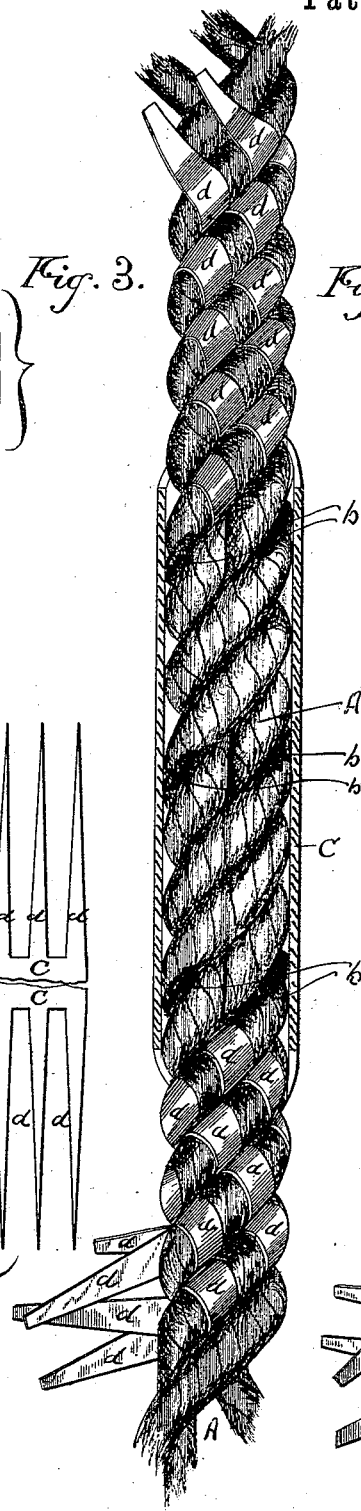
Figure 2:
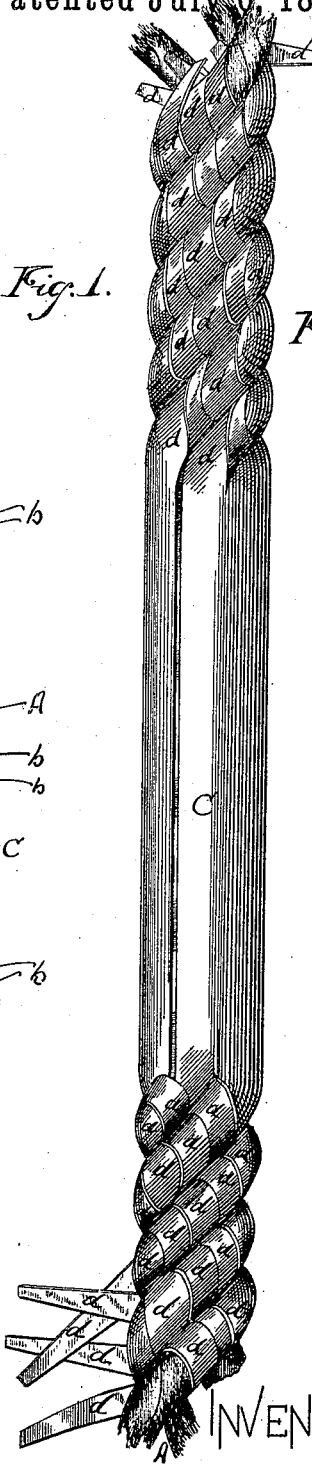

In the accompanying drawings, Figure 1 represents a rope with my splicing-shield applied, the cover being partly removed. Fig. 2 represents the same complete. Figs. 3 and 4 represent different ways for cutting the cover.

A is the rope, joined at the point $b$. C is the splice-sleeve, consisting of a strip of suitable hide or leather, in width equal to or greater than the circumference of the rope, and capable of withstanding an equal tensile strain. The ends of the piece C are slit, as shown, preferably into twice as many thongs, $d\, d$, as there are strands in the rope, and each thong is tapered toward its extremity. The ends of the rope to be spliced may be butt-joined and then wrapped, or they may be joined with an ordinary "short" splice before being wrapped in the sleeve C. If merely butt-joined, the ends are firmly whipped with twine or with wire, and then I prefer to harden and solidify the ends by saturating the fibers with shellac or some similar substance. I prefer, however, to interweave the end strands in an ordinary splice, but somewhat loosely. I then prefer to saturate the spliced portion with shellac. I then wrap the spliced portion tightly in the sleeve-piece C, and temporarily bind it on with twine. The sleeve-piece is sufficiently long to cover entirely the spliced portion and extend both ways beyond the same to points where the strands have not been disturbed. I then select and pass two adjoining thongs $d$ around each strand of the rope, as shown, and continue to wind each strand with one of its two thongs until the end of the thong has been reached. A wide thong could not be wound smoothly around the strand, and I therefore have divided the width belonging to each strand and made two of it. The first thong wound will not meet closely at its edges, and the reserved or second thong when wound will cover the spaces left vacant by the first thong, so that each strand will be completely covered for a distance beyond the undivided end of the sleeve C. The same operation is repeated at the opposite end of the sleeve. The effect of this procedure is, first, the spliced or joined ends of the rope are covered by a sleeve of hide or leather, so that the fibers of the rope are shielded and protected from wear and abrasion on the pulleys as they pass; second, the rope at that point is re-enforced by the covering-sleeve, and the tensile strain is wholly or partly taken off the strands which have been disturbed and sustained in a corresponding degree by the sleeve; third, the sleeve is attached at its ends to the strands of the rope which have not been disturbed as to their relative positions or tension; fourth, the attaching-thongs also separately cover and protect the strands; fifth, the sleeve does not materially increase the diameter of the rope, so as to jam and abrade in the pulley-groove when grooved pulleys are employed; sixth, when the rope is short spliced, the end strands may be slightly reduced, so that when strained they will draw slightly out, but will not separate, and the sleeve will remain full and distended to the full size of the rope.

It may sometimes be desirable to increase the width of the sleeve-piece C, and to accommodate the width of the thongs to the increased width of sleeve-piece. I employ sometimes two sleeve-pieces and separate the thongs, as shown, so that while the width of the sleeve may be increased as desired the width of the thongs wrapped around the strands will not be increased.

Having described my invention, what I claim as new is—

1. The herein-described mode of splicing ropes—that is to say, first, by securing the ends of the strands by whipping or short splicing; second, by covering the spliced portion with a sleeve of suitable hide or leather; third, by fastening the ends of said sleeve to the strands individually, substantially as set forth.

2. A rope having its end strands secured by whipping or short splicing, combined with a covering-shield of suitable material, such as hide, having its ends slit to constitute thongs, and said thongs wrapped around the strands individually, whereby the splicing-sleeve is joined to the rope by wrapping the strands separately at a distance from their ends, as set forth.

WALLACE H. DODGE.

Witnesses:
ED. A. JERNEGAN,
R. D. O. SMITH.